(12) United States Patent
Pun et al.

(10) Patent No.: US 7,391,812 B2
(45) Date of Patent: Jun. 24, 2008

(54) ADAPTIVELY POST FILTERING ENCODED VIDEO

(75) Inventors: Thomas Pun, San Jose, CA (US);
Maynard Handley, Cupertino, CA (US); Roger Kumar, San Francisco, CA (US); Xiaochun Nie, Cupertino, CA (US); Hsi-Jung Wu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 604 days.

(21) Appl. No.: 10/427,756

(22) Filed: Apr. 30, 2003

(65) Prior Publication Data

US 2004/0008787 A1    Jan. 15, 2004

Related U.S. Application Data

(60) Provisional application No. 60/395,955, filed on Jul. 14, 2002.

(51) Int. Cl.
*H04N 7/18*    (2006.01)

(52) U.S. Cl. .............................. 375/240.29; 375/240.26

(58) Field of Classification Search ................................
375/240.01–240.29
See application file for complete search history.

(56) References Cited

U.S. PATENT DOCUMENTS 5,590,064 A * 12/1996 Astle .......................... 708/203
6,041,400 A * 3/2000 Ozcelik et al. ................. 712/35
6,229,852 B1   5/2001 Hoang
6,285,801 B1 * 9/2001 Mancuso et al. ............. 382/268

OTHER PUBLICATIONS

International Search Report, Oct. 22, 2003.

\* cited by examiner

*Primary Examiner*—Anand Rao
(74) *Attorney, Agent, or Firm*—Adell & Tollen LLP

(57) ABSTRACT

Some embodiments of the invention provide a method of decoding an encoded video signal that includes a plurality of successive encoded images. The method initially receives an encoded image of the video signal. It then decodes the encoded image. The method next examines the decoded image to determine whether the decoded image satisfies at least one criterion for performing a post-filter operation on the decoded image. Only if the decoded image satisfies the criterion, the method performs the post-filter operation on the decoded image. The criterion in some embodiments is whether the amount of time for applying the post-filter operation exceeds the remaining amount of time that the method has to process the received image. Some embodiments of the invention provide a method of post-filtering a current image that was decoded from an encoded video signal, which includes a plurality of successive encoded images. The current image has several sub-sections. The method selects a sub-section of the current image. It then determines whether the selected sub-section satisfies at least one condition for performing a post-filter operation on the selected sub-section. The method next performs the post-filter operation on the selected sub-section only if the selected sub-section satisfies the criterion.

7 Claims, 5 Drawing Sheets

ADAPTIVELY POST FILTERING ENCODED VIDEO

CLAIM OF BENEFIT

This patent application claims the benefit of U.S. Provisional Patent Application No. 60/395,955, filed Jul. 14, 2002. This application is incorporated herein by reference.

FIELD OF THE INVENTION

The present invention is directed towards method and apparatus for adaptively performing post filter operations in a decoder.

BACKGROUND OF THE INVENTION

After decoding an encoded data stream, some MPEG decoders perform post filtering to improve image quality. In some cases, the time for post filtering takes about half of the decode time. Accordingly, in many instances, it is impractical to perform post filtering on every decoded image frame. Therefore, there is a need in the art for an adaptive method for performing post filtering. Ideally, such a method would not perform post filtering when it is not needed or when the decoder is not outputting the image data fast enough.

SUMMARY OF THE INVENTION

Some embodiments of the invention provide a method of decoding an encoded video signal that includes a plurality of successive encoded images. The method initially receives an encoded image of the video signal. It then decodes the encoded image. The method next examines the decoded image to determine whether the decoded image satisfies at least one criterion for performing a post-filter operation on the decoded image. Only if the decoded image satisfies the criterion, the method performs the post-filter operation on the decoded image. The criterion in some embodiments is whether the amount of time for applying the post-filter operation exceeds the remaining amount of time that the method has to process the received image.

Some embodiments of the invention provide a method of post-filtering a current image that was decoded from an encoded video signal, which includes a plurality of successive encoded images. The current image has several sub-sections. The method selects a sub-section of the current image. It then determines whether the selected sub-section satisfies at least one condition for performing a post-filter operation on the selected sub-section. The method next performs the post-filter operation on the selected sub-section only if the selected sub-section satisfies the criterion. Examples of several conditions that are used in some embodiments are as follows. For instance, when the selected sub-section is completely defined by reference to a sub-section of another image, some embodiments do not apply a post-filter operation to the selected sub-section, but rather use the result of applying the post-filter operation to the other image's sub-section.

In some cases, the conditions depend on the coding status of the sub-section that is in the next image ("future image") and that corresponds to the selected sub-section. The sub-section of the future image is referred to as the corresponding future sub-section. For instance, when the selected sub-section and corresponding future sub-sections are coded, and the image in the selected sub-section is not covered in the future image, the method in some embodiments applies a first post-filter operation to the selected sub-section. On the other hand, the method in some embodiments applies a second post-filter operation to the selected sub-section when the selected sub-section is coded but the corresponding future sub-section is not coded. This second post-filter operation is more computationally intensive than the first post-filter operation. For the two sets of conditions mentioned above, some embodiments, however, do not apply either the first or second post-filter operations when the corresponding future sub-section is intracoded, i.e., it is encoded in a manner that does not require reference to sub-sections of any other image.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

Figure 1:
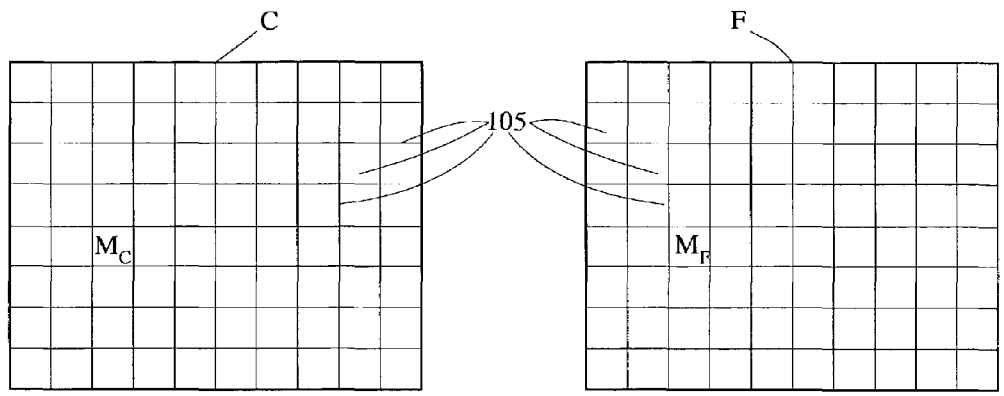
FIG. 1 illustrates two frames and the macroblocks within these two frames.

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a method of decoding an encoded video signal that includes a plurality of successive encoded images. The method initially receives an encoded image of the video signal. It then decodes the encoded image. The method next examines the decoded image to determine whether the decoded image satisfies at least one criterion for performing a post-filter operation on the decoded image. Only if the decoded image satisfies the criterion, the method performs the post-filter operation on the decoded image. The criterion in some embodiments is whether the amount of time for applying the post-filter operation exceeds the remaining amount of time that the method has to decode the received image.

As used in this document, a post-filter operation is an operation that is performed on one or more decoded component color values of an image, in order to enhance the visual quality of the image. Examples of post-filter operation include gamma-correction operations, edge-sharpening operations, noise-removal operations, deblocking-filter operations, deringing operations, etc. A post filter is a module that performs one or more post filter operations.

Some embodiments of the invention provide a method of post-filtering a current image that was decoded from an encoded video signal, which includes a plurality of successive encoded images. The current image has several sub-sections. The method selects a sub-section of the current image. It then determines whether the selected sub-section satisfies at least one condition for performing a post-filter operation on the selected sub-section. The method next performs the post-filter operation on the selected sub-section only if the selected sub-section satisfies the criterion. Examples of several conditions that are used in some embodiments are as follows. For instance, when the selected sub-section is completely defined by reference to a sub-section of another image, some embodiments do not apply a post-filter operation to the selected sub-section, but rather use the result of applying the post-filter operation to the other image's sub-section.

In some cases, the conditions depend on the coding status of the sub-section that is in the next image ("future image") after the current image and that corresponds to the selected sub-section. The sub-section of the future image is referred to as the corresponding future sub-section. For instance, when the selected sub-section and corresponding future sub-sections are coded, and the image in the selected sub-section is not covered in the future image, the method in some embodiments applies a first post-filter operation to the selected sub-section. On the other hand, the method in some embodiments applies a second post-filter operation to the selected sub-section when the selected sub-section is coded but the corresponding future sub-section is not coded. This second post-filter operation is more computationally intensive than the first post-filter operation. For the two sets of conditions mentioned above, some embodiments, however, do not apply either the first or second post-filter operations when the corresponding future sub-section is intracoded, i.e., it is encoded in a manner that does not require reference to sub-sections of any other image.

Several embodiments of the invention are further described below by reference to FIGS. 1-6. These embodiments are used as part of an MPEG decoder. In these embodiments, the images are the frames of the video signal, and the sub-section of the images are macroblocks in the frames. FIG. 1 illustrates two frames that will be referenced in the discussion below. These two frames are the current frame C and the future frame F. Each of these frames includes several macroblocks 105. For every macroblock in frame C, there is a corresponding macroblock in frame F. For instance, the macroblock $M_C$ in frame C has a corresponding macroblock $M_F$ in the future frame F.

Every macroblocks includes 4 8×8 luminance blocks, and two 8×8 chrominance blocks (where one chrominance block is a Cr color block, and the other chrominance block is a Cb color block). A macroblock can be coded as an intrablock, which means that it is encoded in a manner that does not refer to any other macroblocks of any other frames. A macroblock can also be coded as an interblock, which means that it is encoded in a manner that refers to one or more macroblocks in past or future frames. A macroblock can also be designated as "not coded" if it is identical to the corresponding macroblock of the previous frame. One of ordinary skill will realize that other embodiments might use the invention with other types of images, sub-sections of images (e.g., 8-by-4, 8-by-8, 4-by-4, or n-by-m blocks, where n and m are integer values), and other encoding schemes.

Figure 2:
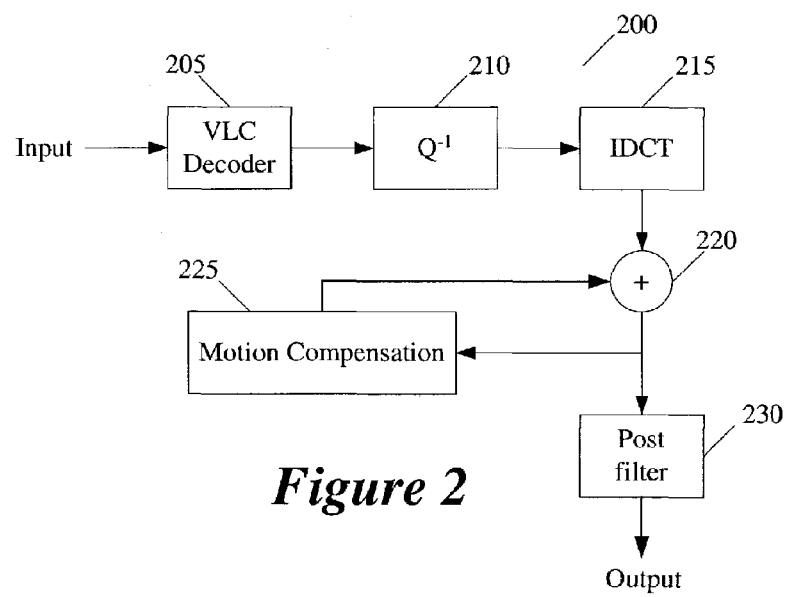
FIG. 2 illustrates a decoder that includes a post filter according to some embodiments of the invention.

FIG. 2 presents a block diagram that conceptually illustrates an MPEG decoder of some embodiments of the invention. One of ordinary skill will realize that other embodiments might implement the invention in other decoders or other decoding implementations. As shown in FIG. 2, the decoder 200 includes a variable length decoder 205, an inverse quantizer 210, an inverse discrete cosine transform ("IDCT") module 215, an adder 220, a motion compensator 225, and a post filter 230.

The variable length decoder 205 receives an MPEG encoded data stream that has been DCT and variable-length encoded. This decoder restores the data stream to its state prior to its variable length encoding. It also uses a particular scan order to store the data stream into data blocks. After the variable length decoder, the data in a data block is in a quantized, DCT-encoded state. The block is then supplied to the inverse quantizer 210, which de-quantizes it (e.g., by multiplying the block with a scalar value or a scalar matrix). Next, the block is supplied to the IDCT module, which performs a DCT decoding operation. Hence, the IDCT module output DCT-decoded and de-quantized blocks. Several more detailed processes for performing the variable length decoding, inverse quantization, and IDCT operations are described in U.S. patent application Ser. No. 10/427,889 filed 4/30/2003, entitled "Video Encoding and Decoding," and which is incorporated herein by reference.

The adder 220 receives these blocks and outputs them straight to the post filter 230 when the blocks are part of a macroblock that is intrablock encoded. On the other hand, when a block is part of a macroblock that is interblock encoded, the adder modifies the block based on data about past and/or future frames that it receives from the motion compensator 225.

Several processes of some embodiments are described below by reference to FIGS. 5-7. These processes are performed by the post filter 230. For instance, the process 400 of FIG. 4 allows the post filter 230 to determine whether it has sufficient time to perform post-filter operations for an entire frame, and if not, whether it has sufficient time to perform post-filter operations on some of the macroblocks of the frame. When the post filter 230 does not have enough time to perform post-filter operations on some of the macroblocks, the process 400 sets the state of the post filter to a "bypass" mode. This mode is to denote that the post filter 230 does not have enough time to perform its operation. The post filter 230 performs the process 500 of FIG. 5 to determine the type of post-filter operations that it needs to apply on all or some of the macroblocks of a frame. The post filter 230 performs the process 600 of FIG. 6 when the post filter is in a bypass mode.

Figure 3:
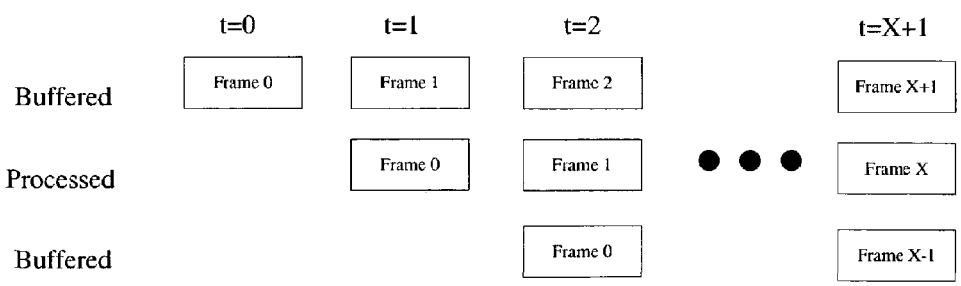
FIG. 3 illustrates the buffering of previous and future frames while a post filter processes a current frame.

After performing some or all of these processes for the blocks of a frame that it receives from the adder 220, the post filter 230 outputs the frame. FIG. 3 illustrates that, at any given time t, the post filter 230 will have buffered the frame before the current one that it is processing, so that it can use the information about this previous frame in processing the current frame. In some embodiments, the previous frame is buffered in a decoded, post-filtered format. As shown in FIG. 3, the post filter 230 also has access to buffered data about the encoding of the future frame that is after the current frame that is being processed. This data is buffered while the future frame is being decoded (e.g., by the VLC decoder). This buffered data is about the encoding of the future frame, e.g., is about how the macroblocks of the future frame are encoded.

Figure 4:
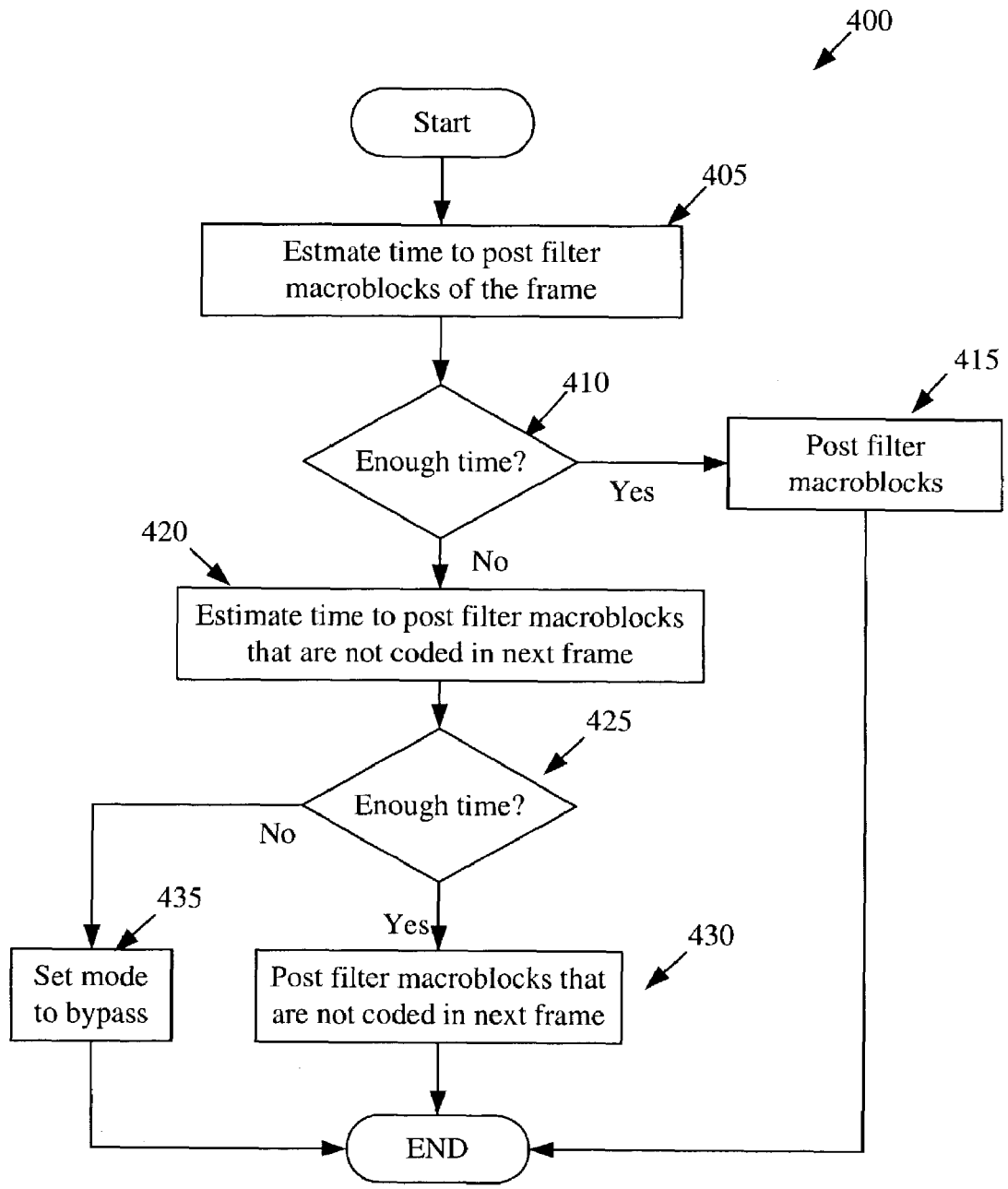
FIGS. 4-6 illustrate processes performed by the post filter of the decoder of FIG. 2.

FIG. 4 illustrates a process 400 that adaptively determines whether to post filter a frame when the post filter is not operating in a bypass mode. As shown in FIG. 4, the process 400 initially computes (at 405) an estimate of the time that is necessary to post filter the macroblocks of the frame. In some embodiments, the estimated time is a running average of the time spent post filtering the frames that came before the current frame. The process then determines (at 410) whether there is enough time to post filter the current frame. At any given time, the decoder 200 has a particular amount of time to output a frame that it has received. Hence, to make the determination at 410, the process compares the estimated time (computed at 405) with the amount of time remaining for presenting the current frame. If the estimated time is less than the remaining amount of time, the process determines that there is sufficient time to post filter the current frame, and hence transitions to 415 to call the post filtering process 500 of FIG. 5, which will be described below.

If the process 400 determines (at 410) that there is not sufficient time to post filter the current frame, the process estimates (a 420) the time to post filter the macroblocks in the current frame that are specified as "not coded" in the next frame. In some embodiments, this estimate equals the number of macroblocks that are "not coded" in the next frame multiplied by an estimated time to perform a strong post filter operation on a macroblock. Some embodiments maintain this estimated time as a running average of the time for each strong post filter operation that they have performed. As mentioned further below, the process 500 of FIG. 5 applies two types of post filter operations, a strong one and a weaker one. An example of a strong post filter is the suggested deblocking filter of MPEG 4, while an example of a weak post filter is the deblocking filter of H.263.

After 420, the process determines (at 425) whether sufficient time remains to post filter the macroblocks in the current frame that are specified as "not coded" in the next frame. In other words, the process determines (at 425) whether the estimate computed at 420 is less than the time that remains for the decoder 200 to present the current frame. If not, the process specifies (at 435) that the post filter is operating in a bypass mode, and then terminates. Otherwise, the process performs (at 430) a strong post filter operation for each macroblock in the current frame that is "not coded" in the next frame, and then ends.

Figure 5:
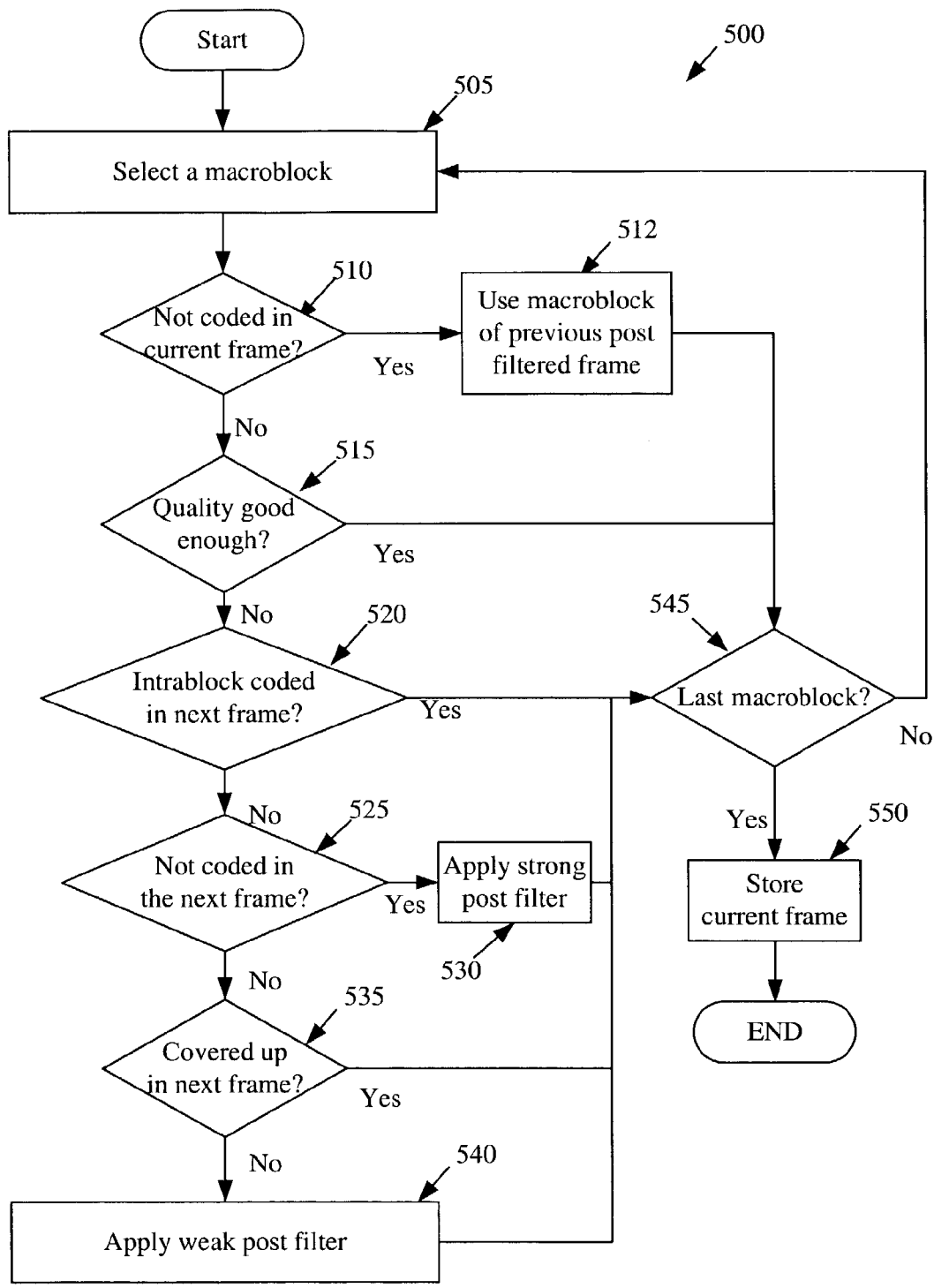

To post-filter a current frame C, the post filter 230 performs the process 500 of FIG. 5. As shown in FIG. 5, the process 500 initially selects (at 505) a macroblock $M_C$ of the current frame C. It then determines (at 510) whether the selected macroblock $M_C$ (i.e., the macroblock selected at 505) is designated as "not coded" in the current frame. If so, the process uses (at 512) the post-filtered macroblock from the previous frame, which is buffered. From 512, the process transitions to 545, which is further described below.

If the process determines (at 510) that the selected macroblock $M_C$ is not designated as "not coded," the process determines (at 515) whether the quality of the macroblock $M_c$ is good enough such that it does not need to be post filtered. Some embodiments make this determination based on the quantizer value for the macroblock. Other embodiments make this determination based on the average quantizer value for the current frame. The received data stream specifies the quantizer value for each macroblock, and hence the post filter obtains this value through the received data stream.

If the process determines (at 515) that the quality of the selected macroblock is good enough, the process transitions to 545 without post filtering the selected macroblock. Otherwise, the process determines (at 520) whether the selected macroblock is designated as an intrablock in the next frame F (i.e., whether the corresponding future macroblock $M_F$ is designated as an intrablock). To perform this look-ahead determination, the post filter delays outputting each frame by one cycle (i.e., the post filter examines and outputs a frame when it receives the next frame from the decoder). In some embodiments, the post filter has a buffer to store post-filtered frame for one cycle so that it can delay outputting each frame by one cycle.

If the selected macroblock is designated as an intrablock encoded (i.e., intracoded) macroblock in the future frame (i.e., if the corresponding future macroblock $M_F$ is intrablock coded), the process transitions to 545 without post filtering the selected macroblock. Otherwise, the process determines (at 525) whether the selected macroblock $M_C$ is designated as "not coded" in the next frame (i.e., whether the corresponding future macroblock $M_F$ is designated as "not coded"). If so, the process performs (at 530) a "strong" computationally intensive post filtering operation on the selected macroblock $M_C$, and then transitions to 545. An example of a computationally intensive post filtering operation is the suggested post filtering operation of MPEG 4.

Otherwise, the process determines (at 535) whether the selected macroblock will get covered up in the next frame by the motion of another object into the region of the macroblock. Some embodiments make this determination based on the motion vector of the corresponding future macroblock $M_F$ in the future frame.

If the selected macroblock will not get covered up in the next frame, the process applies (at 540) a "weak" post filtering operation on the selected macroblock $M_C$, and then transitions to 545. A "weak" post filtering operation is one that is less computationally intensive than the filtering operation performed at 530. When the suggested MPEG 4 post filter is used as the strong filter, the suggested post filter of H263 can be used as the weak filter.

If the selected macroblock $M_C$ will get covered up in the next frame, the process simply transitions to 545. At 545, the process determines whether it has examined all the macroblocks of the current frame. If not, the process transitions back to 505 to select another macroblock $M_C$. Otherwise, the process stores (at 550) the post-filtered current frame into a buffer for use during the next frame's post filtering. After 550, the process terminates.

When the post filter starts to operate in the bypass mode, the post filter in some embodiments stops performing the processes 400 and 500 of FIGS. 4 and 5. Each time the decoder subsequently outputs a new frame C, the post filter in these embodiments performs the process 600 of FIG. 6.

As shown in this figure, the process 600 initially determines (at 610) whether the decoder 200 is still exceeding its allotted time for decoding a frame. If so, the process transitions to 615 to set a timer for delaying the start of the post filtering operations. However, if the decoder is no longer exceeding its allotted time for decoding a frame, the process determines (at 620) whether it should completely stop post filtering operations for the current decoding session. In some embodiments, the process decides to completely stop post filtering when the post filter has entered the bypass mode more than a particular number of times.

Figure 6:
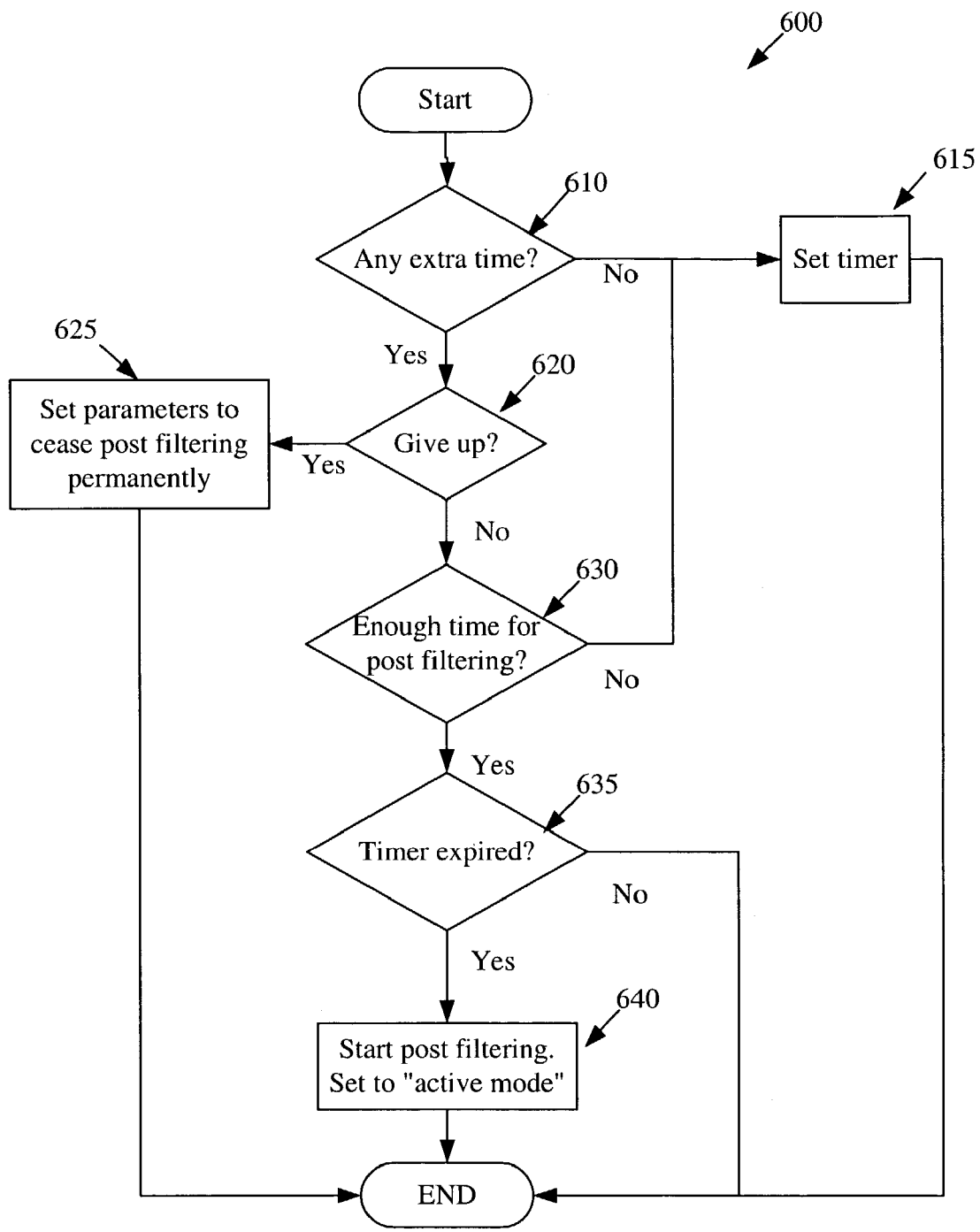

If the process determines that it should stop post filtering operations completely, it transitions to 625 where it sets one or parameters that specify that the post filtering process 400, 500, and 600 of FIGS. 4-6 should not be performed for the current decoding session. Otherwise, the process determines (630) whether there is sufficient time to post filter all the necessary macroblocks of the current frame.

If not, the process transitions to 615, which was described above. Otherwise, the process determines (at 635) whether the timer has expired. The timer is intended to provide the decoder with sufficient time to reach an equilibrium and thereby increase the likelihood that the post filter does not enter the bypass mode immediately. If the process determines (at 635) that the timer has not expired, the process terminates. Otherwise, at 640, the process specifies that the post filter is not operating in a bypass mode, so that the post filter can perform the process 400 of FIG. 4 each time it receives a frame.

Figure 7:
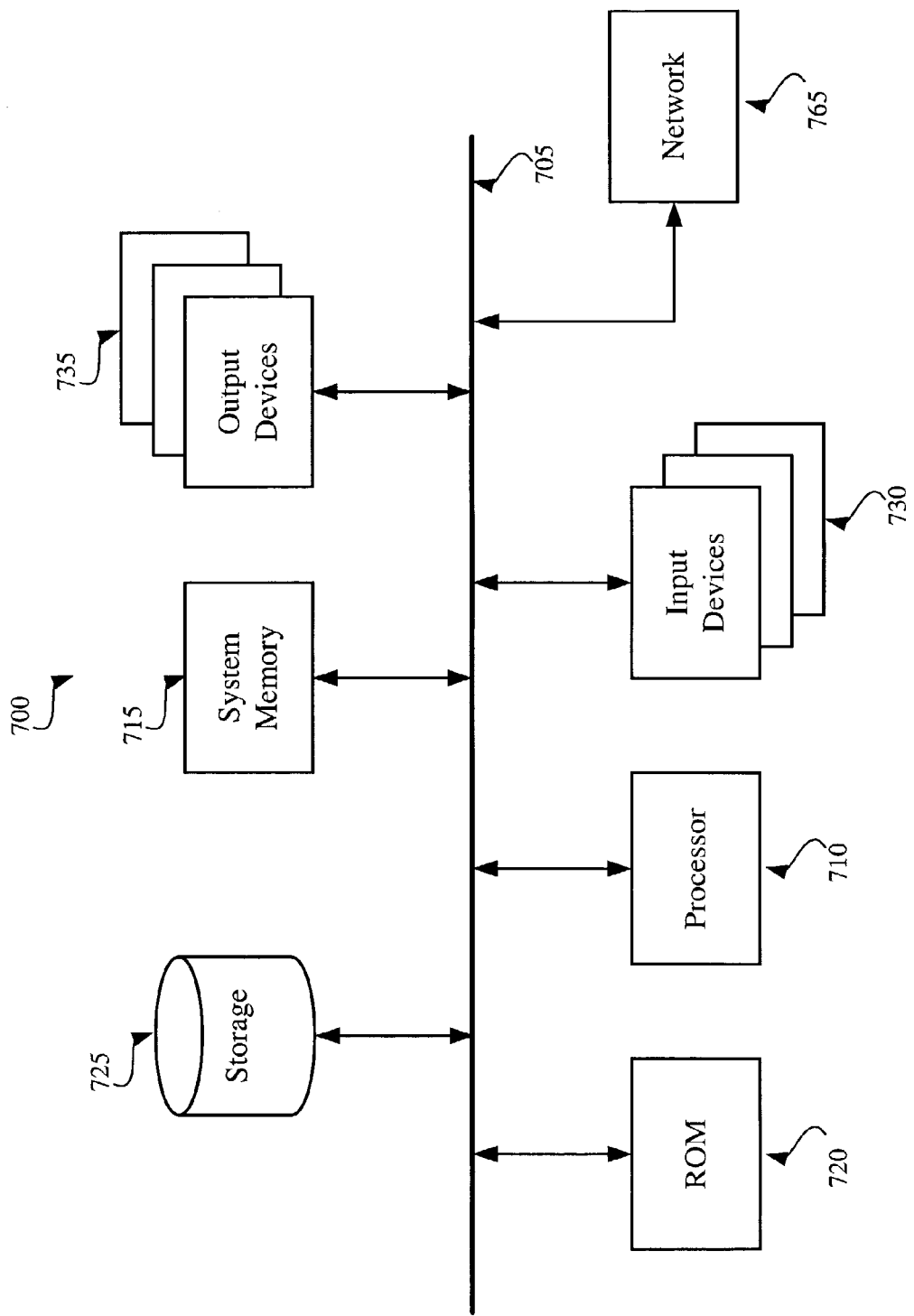
FIG. 7 illustrates a computer system with which one embodiment of the invention is implemented.

FIG. 7 presents a computer system with which one embodiment of the invention is implemented. This computer system can be a standalone computer or it can be part of another device, such as a DVD player, video player, etc. Computer system 700 includes a bus 705, a processor 710, a system memory 715, a read-only memory 720, a permanent storage device 725, input devices 730, and output devices 735.

The bus 705 collectively represents all system, peripheral, and chipset buses that communicatively connect the numerous internal devices of the computer system 700. For instance, the bus 705 communicatively connects the processor 710 with the read-only memory 720, the system memory 715, and the permanent storage device 725.

From these various memory units, the processor 710 retrieves instructions to execute and data to process in order to execute the processes of the invention. The read-only-memory (ROM) 720 stores static data and instructions that are needed by the processor 710 and other modules of the computer system.

The permanent storage device 725, on the other hand, is read-and-write memory device. This device is a non-volatile memory unit that stores instruction and data even when the computer system 700 is off. Some embodiments of the invention use a mass-storage device (such as a magnetic or optical disk and its corresponding disk drive) as the permanent storage device 725.

Other embodiments use a removable storage device (such as a floppy disk or zip® disk, and its corresponding disk drive) as the permanent storage device. Like the permanent storage device 725, the system memory 715 is a read-and-write memory device. However, unlike storage device 725, the system memory is a volatile read-and-write memory, such as a random access memory. The system memory stores some of the instructions and data that the processor needs at runtime. In some embodiments, the invention's processes are stored in the system memory 715, the permanent storage device 725, and/or the read-only memory 720.

The bus 705 also connects to the input and output devices 730 and 735. The input devices enable the user to communicate information and select commands to the computer system. The input devices 730 include alphanumeric keyboards and cursor-controllers. The output devices 735 display images generated by the computer system. For instance, these devices display IC design layouts. The output devices include printers and display devices, such as cathode ray tubes (CRT) or liquid crystal displays (LCD).

Finally, as shown in FIG. 7, bus 705 also couples computer 700 to a network 765 through a network adapter (not shown). In this manner, the computer can be a part of a network of computers (such as a local area network ("LAN"), a wide area network ("WAN"), or an Intranet) or a network of networks (such as the Internet). Any or all of the components of computer system 700 may be used in conjunction with the invention. However, one of ordinary skill in the art would appreciate that any other system configuration may also be used in conjunction with the present invention.

The post-filtering processes that were described above have several advantages. For instance, they provide an adaptive method for performing post filtering that does not waste time post filtering a macroblock that does not need to be post-filtered (e.g., does not post filter a macroblock that is intrablock coded or is covered in the next frame). Also, these processes allow the post filtering to be temporarily halted when the decoder is not outputting the image data fast enough.

While the invention has been described with reference to numerous specific details, one of ordinary skill in the art will recognize that the invention can be embodied in other specific forms without departing from the spirit of the invention. For instance, in some embodiments, the post filter does not delay the frame output by one cycle and does not look-ahead into the next frame to determine how a macroblock is coded. In these embodiments, the post filter decides to perform a post filtering operation based on whether the quality of the macroblock is good enough and/or whether the macroblock is "not coded." Also, even though some of the embodiments were described above by reference to macroblocks, one of ordinary skill will realize that other embodiments might apply the invention to other groupings of pixels.

In addition, the above-described processes examine the previous and next frames that are before and after the current frame. However, for a current frames, other embodiments might analyze frames that are not immediately before or immediately after the current frame. The reference frames might be several frames removed from the current frame. Also, some embodiments might examine more than one prior frames and/or more than one future frames.

FIG. 2 illustrates that some embodiments are implemented in a post filter of a decoder. Other embodiments, however, might be implemented in a post filter of a feedback-decoding loop of an encoder (such as the feedback-decoding loop of an MPEG encoder). Thus, one of ordinary skill in the art would understand that the invention is not to be limited by the foregoing illustrative details, but rather is to be defined by the appended claims.

We claim:

1. A method of performing a post-filter operation after decoding video, said video comprising a plurality of successive images, wherein the method has a particular amount of time to process an image that it receives, the method comprising:
   a) receiving an image:
   b) determining whether there is sufficient time to perform a post-filter operation on the received image, said determining comprising:
      i) computing an estimate of the time necessary for performing a post-filter operation on the received image; and
      ii) determining whether the computed time estimate is less than the time that the method has to process the image; and
   c) performing the post-filter operation on the received image only if there is sufficient time to perform the post-filter operation.

2. A method of performing a post-filter operation after decoding video, said video comprising a plurality of successive images, wherein each image includes a plurality of two dimensional sub-sections, the method comprising:
   a) receiving an image;
   b) determining whether there is sufficient time to perform a post-filter operation on the received image;
   c) performing the post-filter operation on the received image only if there is sufficient time to perform the post-filter operation,
   d) if there is insufficient time to perform the post-filter operation, determining whether there is sufficient time to perform post-filter operations on a particular set of sub-sections of the received image; and
   e) performing post-filter operations on the particular set of sub-sections of the received image only if there is sufficient time to perform the post-filter operations.

3. The method of claim 2, wherein the received image is a first image, wherein the sub-sections in an image are either coded or not coded, wherein the method further comprises:
   receiving a second image;
   wherein the set of sub-section in the first image correspond to a set of sub-sections in the second image that are not coded.

4. The method of claim 2, wherein determining whether there is sufficient time to perform post filter operations on the set of sub-sections comprises:
   a) computing an estimate of the time necessary for performing post-filter operations on the set of sub-sections;
   b) determining whether the computed time estimate for performing post-filter operations on the set of sub-sections is less than the time that the method has to present the image.

5. The method of claim 4, wherein the received image is a video frame and the sub-sections are macroblocks in the frame.

6. The method of claim 2 further comprising:
a) suspending post-filter operations when there is insufficient time to perform the post-filter operations on the particular set of sub-sections of the received image;
b) receiving a subsequent image;
c) resuming the post-filter operations when a time to decode the subsequent image is less than an allotted time to decode the subsequent image.

7. The method of claim 2 further comprising:
a) suspending post-filter operations when there is insufficient time to perform the post-filter operations on the particular set of sub-sections of the received image;
b) receiving a subsequent image;
c) completely stopping post-filter operations for a current decoding session when a time to decode the subsequent image is less than an allotted time to decode the subsequent image and the post-filter operations have been suspended more than a particular number of times.

* * * * *